(12) United States Patent
Hulin et al.

(10) Patent No.: US 6,971,830 B2
(45) Date of Patent: Dec. 6, 2005

(54) DEVICE COMPRISING A SADDLE FOR THE FIXING OF A PART TO A PANEL

(75) Inventors: Martial Hulin, Liancourt (FR); Christophe Trepreau, Paris (FR)

(73) Assignee: I.T.W. De France, Beauchamp (FR)

( * ) Notice: Subject to any disclaimer, the term of this patent is extended or adjusted under 35 U.S.C. 154(b) by 0 days.

(21) Appl. No.: 10/457,389

(22) Filed: Jun. 10, 2003

(65) Prior Publication Data

US 2004/0001743 A1  Jan. 1, 2004

(30) Foreign Application Priority Data

Jun. 28, 2002 (FR) .................................. 02 08117

(51) Int. Cl.[7] .............................................. F16B 37/02
(52) U.S. Cl. ..................... 411/175; 411/174; 411/112; 411/184; 411/187
(58) Field of Search ........................ 411/175, 174, 112, 411/173, 184, 187, 170

(56) References Cited

U.S. PATENT DOCUMENTS

| | | | |
|---|---|---|---|
| 3,426,818 A * | 2/1969 | Derby | 411/175 |
| 3,669,170 A * | 6/1972 | Schuster | 411/175 |
| 3,693,495 A * | 9/1972 | Wagner | 411/377 |
| 3,999,583 A * | 12/1976 | Nelson | 411/182 |
| 4,508,477 A * | 4/1985 | Oehlke et al. | 411/174 |
| 4,684,305 A * | 8/1987 | Dubost | 411/174 |
| 4,798,507 A | 1/1989 | Olah | |
| 4,883,397 A * | 11/1989 | Dubost | 411/174 |
| 4,897,005 A | 1/1990 | Peterson et al. | |
| 5,039,264 A * | 8/1991 | Benn | 411/175 |
| 5,599,148 A * | 2/1997 | Hirose | 411/175 |
| 6,006,414 A * | 12/1999 | Corporon et al. | 29/525.02 |
| 6,263,562 B1 * | 7/2001 | Gosis et al. | 29/809 |
| 6,450,747 B1 * | 9/2002 | Fischer | 411/174 |

FOREIGN PATENT DOCUMENTS

| | | | | |
|---|---|---|---|---|
| DE | 3927239 A1 * | 2/1991 | | F16B 37/02 |
| FR | 0407282 A1 * | 6/1990 | | F16B 37/04 |
| FR | 2 719 347 A | 11/1994 | | |

* cited by examiner

Primary Examiner—Katherine Mitchell
(74) Attorney, Agent, or Firm—Lowe Hauptman & Berner, LLP

(57) ABSTRACT

Device for the fixing of a part to a panel equipped with a drilling, such device comprising a saddle with two facing arms drilled with coaxial holes one, of which has a shank forming a nut. The arms being able to be placed on either side of the panel with their holes facing the aforementioned drilling. One arm is equipped with a lug in which one of the holes is made. The lug may include a protruding ridge able to be lodged in the aforementioned drilling to allow for the saddle to be snapped onto and thus fixed to the panel.

20 Claims, 4 Drawing Sheets

DEVICE COMPRISING A SADDLE FOR THE FIXING OF A PART TO A PANEL

BACKGROUND

The invention relates to the fixing of a part onto a panel. This could be for example, for an automotive vehicle, fixing a bumper to a body component or a lining to a door.

More specifically, it relates to a device that, for the fixing of the part to the panel, comprises a saddle with an upper arm and a facing lower arm, connected by a plate and drilled with coaxial holes.

To fix the part to the panel, both of which have drillings to this end, the saddle is mounted on the edge of the panel in such a way that its arms are on either side of it, with their respective holes facing the drilling made in the panel, and the plate of the saddle is facing the edge of the panel.

The part to be fixed is then positioned on the lower arm of the saddle, with its drilling placed facing the hole made in the arm.

A screw is then inserted into the drilling in the part, and is pushed successively through the lower arm and then the panel, before being screwed into the upper arm, tightening both the part to the lower arm and the panel between the arms.

The known devices of this type present a number of disadvantages.

Firstly, the positioning of the saddle on the panel is difficult, especially because, as we have seen, it must be placed over the drilling made in the panel. Mounting the saddle is made even more problematic when it is done blind, as there is no means of checking if it is correctly positioned.

Then, the saddle's hold on the panel is often inadequate. It is common, particularly in the automotive field, to mount the saddle some time before the screw is inserted, these two operations being carried out at different stations. It is therefore frequent, particularly under the effect of the vibrations experienced by the vehicle when it is transferred from one station to another, for one or more saddles to move along the edge of the panel, or even fall off it. They therefore have to be repositioned to allow for screwing. This leads to losses in productivity.

In addition, a specific type of saddle generally corresponds to a certain panel thickness, and cannot be mounted either on a thicker panel or a thinner panel.

Moreover, problems are often encountered with the rigidity and hold of the fixing produced.

SUMMARY

The invention aims to solve the aforementioned disadvantages in particular, by proposing a fixing device that is both easy and practical to use under all circumstances, including blind, that allows for a part to be fixed to panels of varying thicknesses, and that is more reliable in such a way as to allow for durable, rigid fixing.

To this end, the invention proposes a device for fixing a part to a panel provided with a drilling, the said device comprising a saddle equipped with an upper arm and a facing lower arm that together define an opening opposite which they are connected by a plate. The upper and lower arms respectively have coaxial upper and lower holes, the upper arm having a shank forming a nut in which the upper hole is made, and the arms being able to be placed on either side of the panel with their holes facing the aforementioned drilling whilst the plate is placed facing the edge of the panel. The lower arm is equipped with an elastically flexible lug articulated by a rim located on the side of the opening and in which the lower hole is made, the lug having a ridge that protrudes from the lower arm towards the upper arm and is able to be lodged in the aforementioned drilling to allow for the saddle to be snapped onto and thus fixed to the panel.

Given this specific embodiment of the saddle, its correct positioning on the panel is characterised by an audible click, which assures the user that the ridge has been received in the drilling in the panel, and that the holes in the arms are correctly facing the said drilling.

In this context, the saddle is guaranteed to hold on the panel under any circumstances even before the screw is inserted.

According to one embodiment, the aforementioned ridge has a face that slopes towards the aforementioned opening, in order to allow for the gradual pushing aside of the lug when the saddle is mounted, under the pressure of the panel.

For example, the ridge extends circularly around the edge of the hole made in the lug.

The upper arm has, for example, a ramp that slopes towards the opening, able to guide the panel towards the lower arm when the saddle is mounted.

The lower arm may have, on the side of the aforementioned opening, a chamfered free edge, in order to further guide the panel.

Preferably, the plate is thicker than the arms, whilst the upper arm is thicker than the lower arm, in such a way that the lower arm has a certain flexibility that facilitates the mounting of the saddle onto the panel.

According to one embodiment, the aforementioned lug is delimited by a U-shaped cut-out, the concavity of which faces the aforementioned opening.

For example, the aforementioned shank protrudes at least partly on the outer side of the upper arm, on which side it is preferably ribbed in order to provide increased stiffness, particularly in torsion.

The shank may also protrude partly on the inner side of the upper arm; it may be extended, on this side, by a ridge able to be lodged in the drilling made in the panel when the saddle is mounted on it, which further increases the hold of the saddle on the panel.

In addition, the upper arm may have, on the inner side, a collar protruding radially from the shank, against which the panel may press.

According to one embodiment, the upper arm also has an elastically flexible tongue that protrudes towards the lower arm and is able to push the panel towards the lower arm to improve the hold of the saddle on the panel.

This tongue may, for example, stem from the aforementioned collar, which increases its flexion capacity.

BRIEF DESCRIPTION OF THE DRAWINGS

The description below of an embodiment given as a non-exhaustive example highlights other characteristics and advantages of the invention; the description is given with reference to the appended drawings, in which.

DETAILED DESCRIPTION

FIGS. 8–11 show a panel 1 on which a part 2 is to be rigidly fixed.

Figure 9:
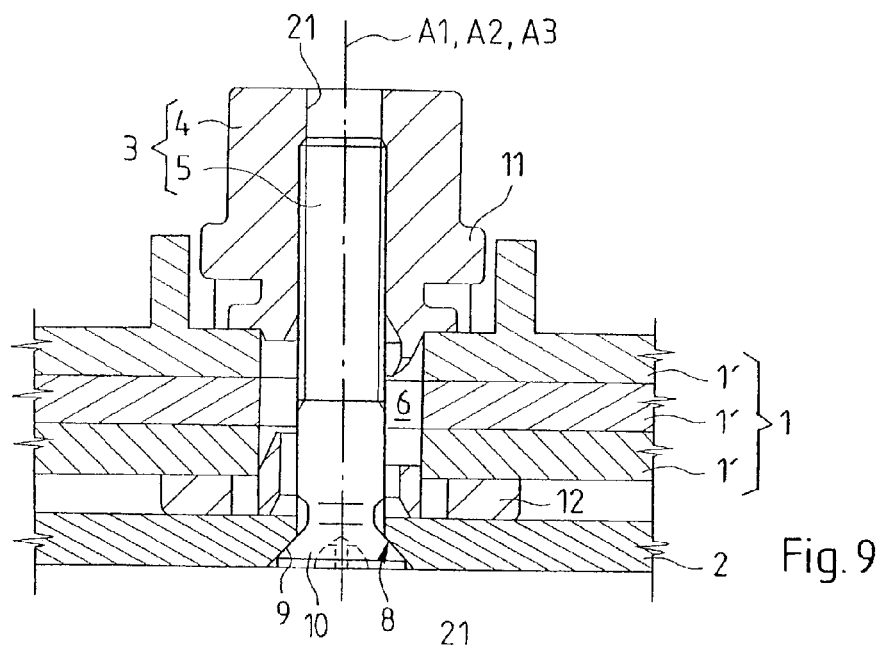
FIG. 9 is an analogous view to FIG. 8, on which a plate fixed to the panel by means of a screw that engages in the saddle is also shown.

FIG. 9 shows a panel 1 on which a part 2 is to be rigidly fixed.

The panel 1 and the part 2 to be fixed are, for example, two body components of a vehicle under production or repair, such as, respectively, a chassis component and a bumper component or, respectively, a door component and a lining designed to cover it.

As shown in FIG. 9, the panel 1 and the part 2 to be fixed are both in the form of a plate or, in this case for the panel 1, in the form of a plurality of superposed plates 1'. This can either be a general configuration, for example if the panel 1 and/or the part 2 are two thin metal sheets to be fixed, or a local configuration, with the panel 1 and/or the part 2 belonging to components with a more complex overall shape.

The part 2 and the panel 1 are assembled by means of a fixing device 3 comprising a saddle 4 forming a nut, which is mounted on the panel 1, and a screw 5 (FIG. 9) that engages in the saddle 4 through the part 2 and the panel 1.

To enable the screw 5 to be passed through, the panel 1 has a circular section drilling 6 with axis A1 located near its edge 7 (FIGS. 10 and 11), whilst the part 2 is provided with an orifice 8 (FIG. 9) with axis A2, which is chamfered at 9 to take the screw head 10.

Referring to FIGS. 1–7, the saddle 4 has an upper arm 11 and a lower arm 12, approximately flat and parallel, with a rectangular general outline, which have facing inner faces 13, 14 and opposing outer faces 15, 16.

The saddle 4 has an upper arm 11 and a lower arm 12, approximately flat and parallel, with a rectangular general outline, which have facing inner faces 13, 14 and opposing outer faces 15, 16.

The arms 11, 12 have free edges 17, 18 respectively between which they define an opening 19 through which the saddle 4 is mounted on the panel 1 (FIGS. 8–11), and opposite which they are connected by a flat plate 20 that is approximately perpendicular to them, so that the saddle 4 has an approximately U-shaped profile.

The upper arm 11 and the lower arm 12 are drilled, respectively, with an upper hole 21 and a lower hole 22 that face each other and are coaxial, and the common axis A3 of which is perpendicular to the arms 11, 12.

As will be seen below, the upper arm 11 has a shank 23 forming a nut in which the upper hole 21 is made and in which the screw 5 (FIG. 9) is able to engage when the part 2 is fixed to the panel 1.

The lower arm 12 is equipped with an elastically flexible lug 24 that, in the absence of load, extends generally in the plane of the arm 12.

The lug 24, in which the lower hole 22 is made, is articulated to the arm 12 by a rim 25 located on the side of the opening 19 and that extends approximately parallel to the free edge 18 of the arm 12, close to it.

Figure 1:
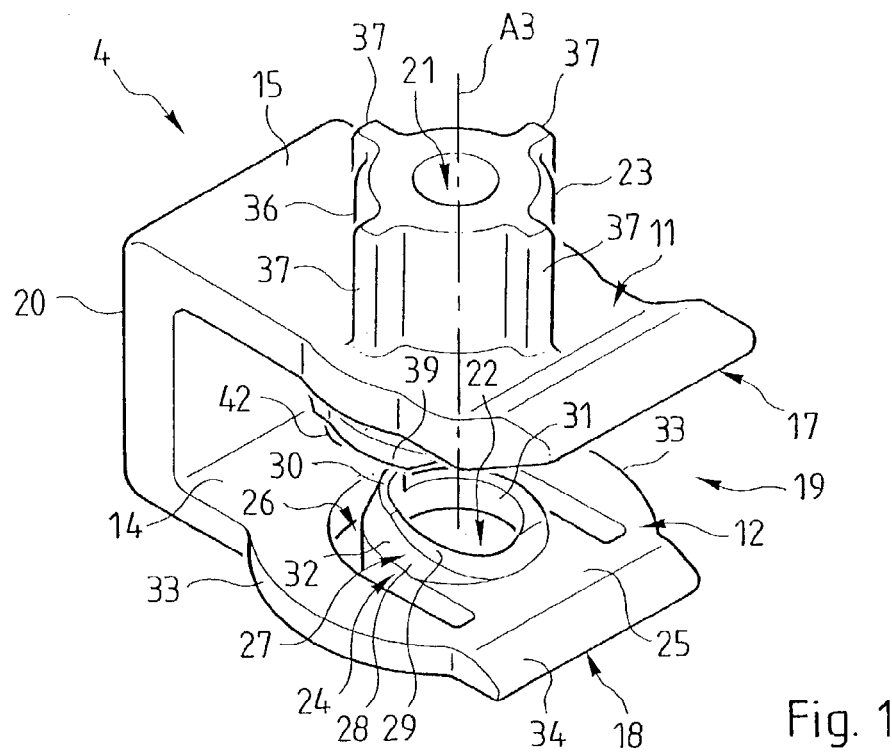
FIG. 1 is a perspective top view of a saddle able to be mounted on the edge of a panel to fix any part to the panel.
Figure 2:
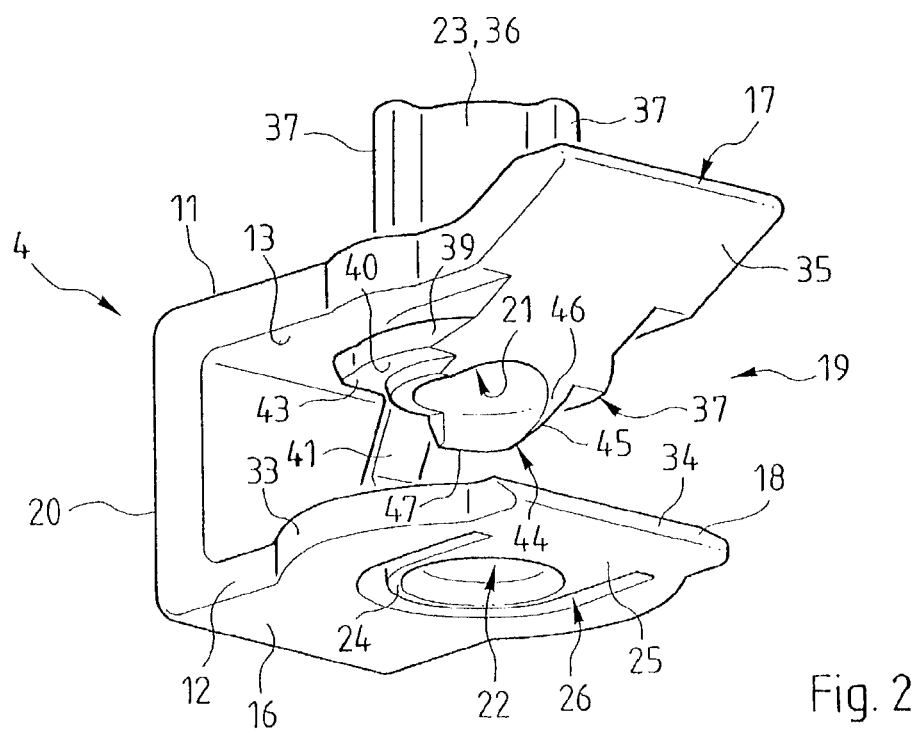
FIG. 2 is a perspective bottom view of the saddle in FIG. 1.
Figure 3:
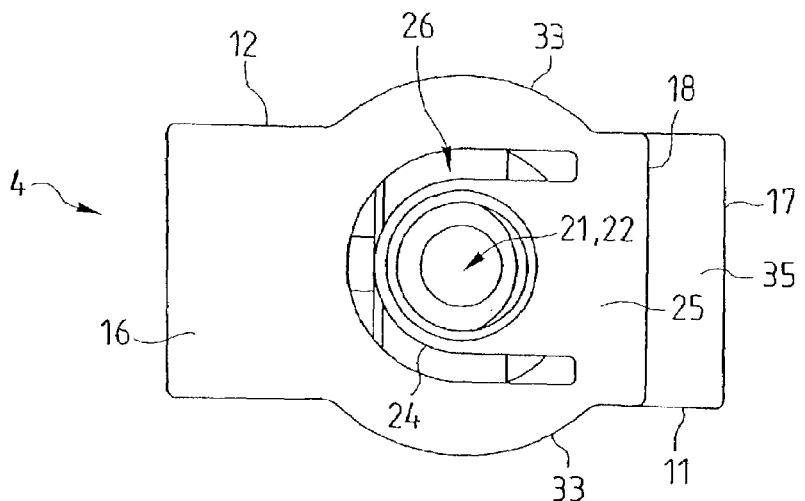
FIG. 3 is a bottom plan view of the saddle in FIGS. 1 and 2.

As shown in FIGS. 1 and 2, the lug 24 is delimited by a U-shaped cut-out 26, the concavity of which faces towards the free edge 18 of the lower arm 12, i.e. towards the opening 19. The lug 24 has a rounded profile, but it could equally have a rectangular profile without this impairing its operation, which will be described below.

On the outer side of the lower arm 12, i.e. on the side of the outer face 16 of the arm, the lug 24 is flush with the external face 16 in the absence of load.

On the other hand, on the inner side of the lower arm 12, i.e. on the side of its internal face 14, the lug 24 has a lower ridge 27 that extends beyond the inner face 14 and protrudes from the lower arm 12 towards the upper arm 11 and is lodged in the drilling 6 in the panel 1 when the saddle 4 is mounted, to enable the saddle 4 to be snapped onto and thus fixed to the panel 1, as will be seen below.

The lower ridge 27, which extends circularly around the lower hole 22 on the edge of the hole, does not have a constant height.

In fact, it has a front section 28 that extends at an angle of approximately 90° from the articulation rim 25, and the height of which, measured from the inner face 14 perpendicular to it, increases towards the plate 20.

This front section 28 thus forms a face 29 that slopes towards the opening 19, the sloping face 29 forming a runway that tends to push the lug 24 outwards under the pressure of the panel 1 when the saddle 4 is mounted on the latter.

This front section 28 is extended by a rear section 30 that extends at an angle of approximately 90°, the height of which is constant.

As can be seen on FIG. 1, the ridge 27 has, on the side of the hole 22, a cylindrical inner surface 31 that forms the edge of the hole 22 and, on the side of the cut-out 26, a tapered outer surface 32 that, by automatically centering the hole 22 relative to the drilling 6 in the panel 1, contributes to the correct positioning of the saddle 4 on the latter.

Thus, the ridge 27 is asymmetrical and extends mainly on one side only of the hole 22; this specific feature is due to a moulding requirement, in this case to allow for the lateral removal of mould slides from the mould.

In order to increase the area of the lower arm 12, in particular to recover the area lost due to the cut-out 26, the arm 12 has locally, around the lug 24, a circular profile 33 which, through the protrusion it forms, can assist in mounting polarisation when the saddle 4 is mounted on the panel 1 in certain specific cases, as will be seen below.

In addition, in order to assist in guiding the panel 1 into the opening 19 between the arms 11, 12, the edge 18 of the lower arm 12 is chamfered at 34, as shown on FIG. 1 in particular.

However, the guidance is mainly provided by a sloping ramp 35 formed on the upper arm 11, facing towards the opening 19 and extending from the upper hole 21 to the free edge 17 of the upper arm 11, which is, as can be seen in FIG.

4, much longer than the lower arm 12, so that the ramp 35 extends beyond the free edge 18 of the lower arm 12.

Moreover, the upper arm 11 is even curved outwards in the vicinity of its free edge 17.

Thus, working in conjunction with the edge 7 of the panel 1 (FIGS. 10 and 11), the ramp 35 guides the panel towards the lower arm 12—or vice versa—which facilitates the mounting of the saddle 4.

Figure 4:
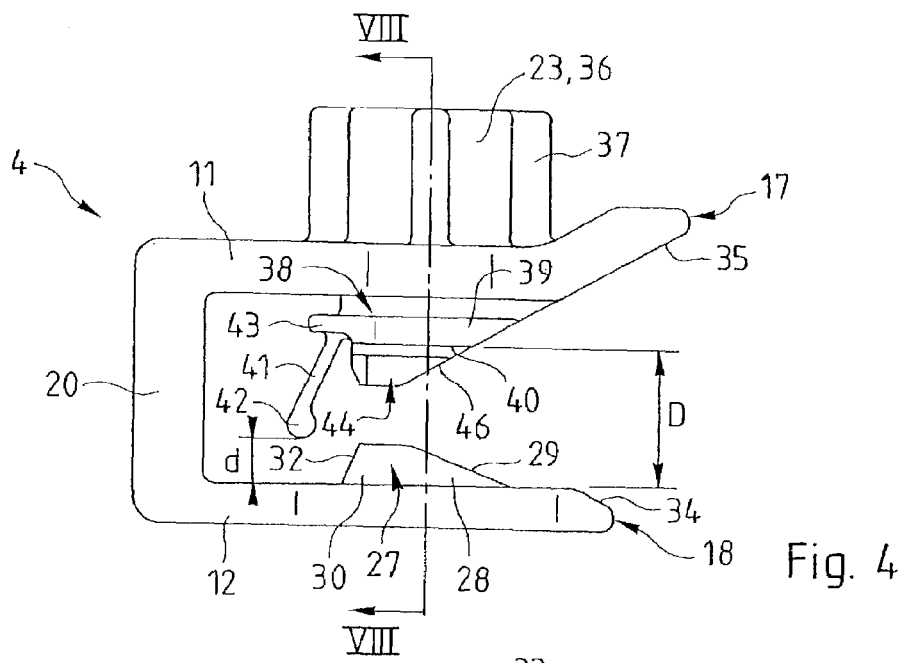
FIG. 4 is a vertical plan view, from the side, of the saddle in the previous figures.
Figure 5:
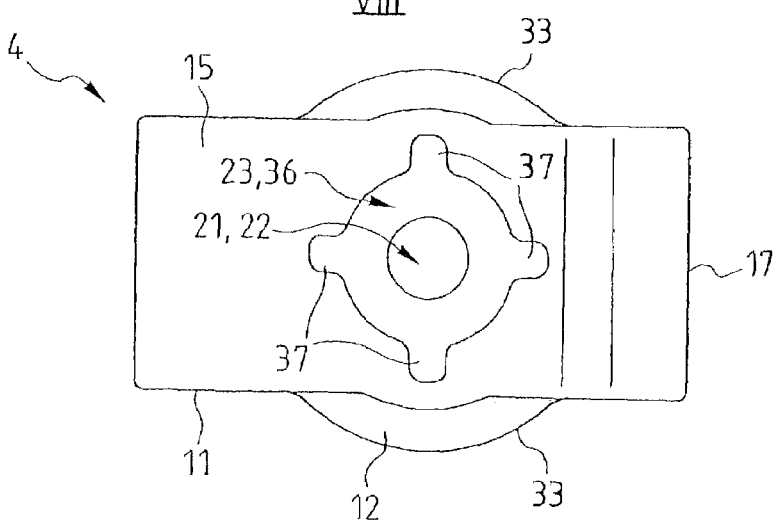
FIG. 5 is a top plan view of the saddle in the previous figures.
Figure 6:
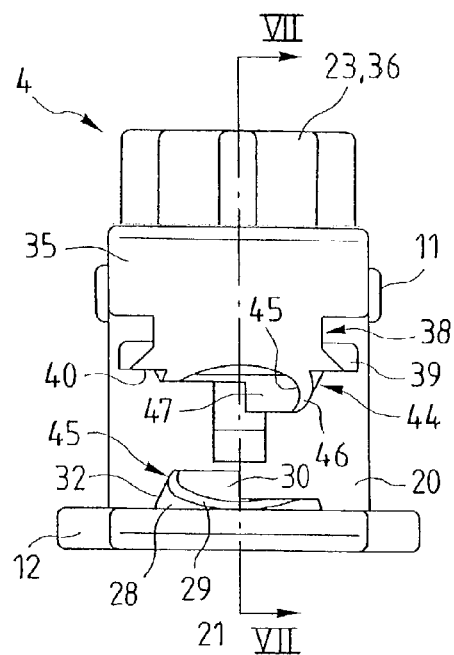
FIG. 6 is a vertical plan view, from the side of the opening, of the saddle in the previous figures.

Moreover, as can be seen in FIG. 4, the plate 20 is thicker than the arms 11, 12 and the upper arm 11, which, it must be remembered, forms the nut into which the screw 5 is designed to engage, is thicker than the lower arm 12.

In this way, the angle section formed by the plate 20 and the upper arm 11 presents a certain rigidity that makes it relatively indeformable when the saddle 4 is mounted on the panel 1, whilst the lower arm 12 is relatively deformable and is able to flex elastically under the pressure of the panel 1.

The shank 23 has a generally cylindrical upper section 36 that protrudes from the outer side of the upper arm 11, i.e. on the side of the external face 15 of the upper arm 11. As shown on FIG. 1, the shank 23 is ribbed. More specifically, its has four ribs 37 distributed in a the form of a cross, which increase the stiffness of the shank 23, not only in flexure when the screw 5 is inserted, but especially in torsion when the screw is tightened; the screw is self-tapping and directly works its complementary internal thread into the shank 23.

The shank 23 also has a lower section 38 that, continuing on from the upper section 36, protrudes beyond the inner side of the upper arm 11, i.e. on the side of the inner face 13 of the upper arm 11.

As shown on FIG. 2, the upper arm 11 has a collar 39 that, at a given distance from the inner face 13, protrudes radially from the shank 23 to form a crown-shaped bearing face 40 against which the panel 1, on which the saddle 4 is mounted, rests.

This cooperation between the bearing face 40 and the collar 39, and the panel 1, takes place at least on screwing, which tends to bring the arms 11, 12, between which the panel 1 will be held, closer together.

Figure 8:
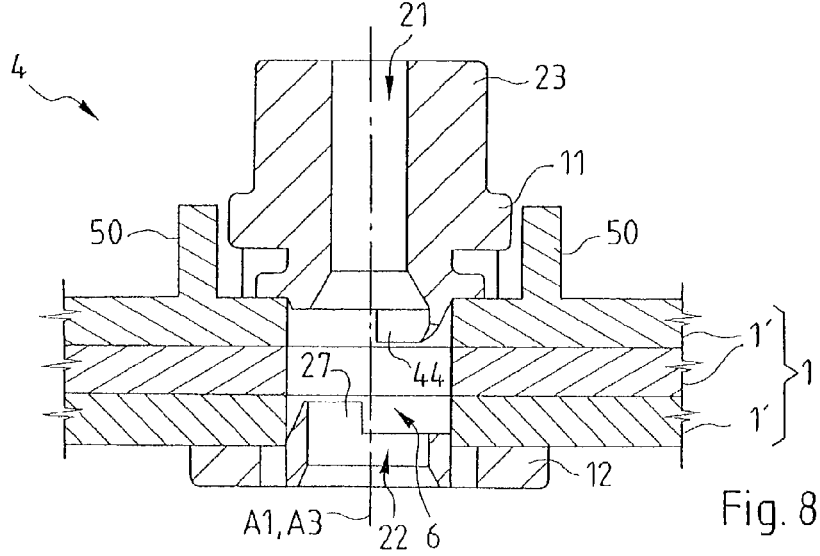
FIG. 8 is a cross-section vertical view of the saddle in the previous figures, along the cutting plane shown on FIG. 4 by the line VIII—VIII, the saddle being mounted on a panel made up of three superposed plates.

However, this cooperation may also take place when the saddle 4 is mounted, depending on the thickness of the panel 1 (FIG. 8).

In fact, in order to provide, even before the addition of the screw 5, reliable hold of the saddle 4 on the panel 1, however thick it is, the upper arm 11 is equipped with an elastically flexible tongue 41 that protrudes towards to the lower arm 12.

This tongue 41 is located between the upper hole 21 and the plate 20; it has a cylindrical free end 42 that, close to the inner face 13 of the upper arm 11, extends parallel to both the inner face 13 and the plate 20.

When the saddle 4 is mounted on the panel 1, the tongue 41 flexes in the direction of the plate 20 under the pressure of the panel 1, which meets and then slides on its free end 42.

Under the effect of its own elasticity, the tongue 41 pushes the panel 1 towards the lower arm 12, and holds it firmly against it.

As can be seen on FIG. 4, the tongue 41 stems from the collar 39. More specifically, it stems from a thin rear section 43 of the collar, which extends on the side of the plate 20, and which can flex towards the inner face 13, together with the tongue 41, under the pressure of the panel 1.

In addition, the lower section 38 of the shank 23 is extended, on the other side of the collar 39 relative to the inner face 13, by an upper ridge 44, similar to the lower ridge 27 described above, but that mainly extends, relative to the lower ridge, on the other side of a plane perpendicular to the plate 20 that passes through the axis A3 of the holes 21, 22, such plane being the general plane of symmetry of the saddle 4.

As previously, this specific shape is due to a moulding requirement with the aim of allowing for the lateral removal of a mould slide from the mould.

In the same way as the lower ridge 27, the upper ridge 44 has a front section 45, which extends at an angle of approximately 90°, and the height of which increases from the ramp 35 towards the plate 20.

This front section 45 forms a sloping face 46 that extends as a continuation of the ramp 35; it is extended by a rear section 47 that has a constant height and extends at an angle of approximately 90°.

When the saddle 4 is mounted on a sufficiently thick panel 1, as can be seen on FIG. 8, the upper ridge 44 is lodged in the drilling 6 on the panel 1.

Moreover, in order to automatically centre the upper hole 22 relative to the drilling 6, the upper ridge 44 has a tapered outer surface 48 (FIG. 7) that guides the upper ridge 44 relative to the panel 1.

Figure 7:
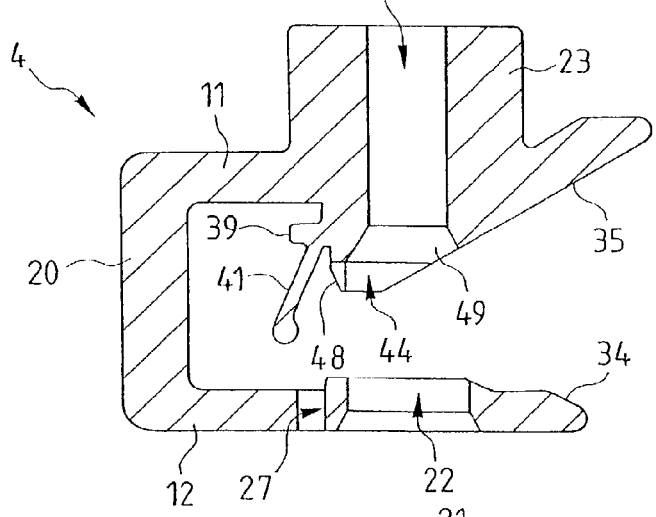
FIG. 7 is a cross-section vertical view of the saddle in the previous figures, along the cutting plane shown on FIG. 6 by the line VII—VII.

In addition, as can be seen on FIG. 7, at the level of the upper ridge 44, the shank 23 has a tapered inner surface 49 able to guide the screw 5 when it is inserted into the shank 23.

Referring to FIGS. 4 and 8–11, the part 2 is fixed onto the panel 1 as follows.

First, the saddle 4 is mounted on the panel 1, which has a thickness e (FIGS. 10 and 11) the value of which is between the value of the distance d (FIG. 4) between the free end 42 of the tongue 41 and the inner face 14 of the lower arm 12 on the one hand (FIG. 10), and the value of the distance D (FIG. 4) between the facing inner faces 13, 14 on the other hand (FIGS. 8, 9).

Figure 10:
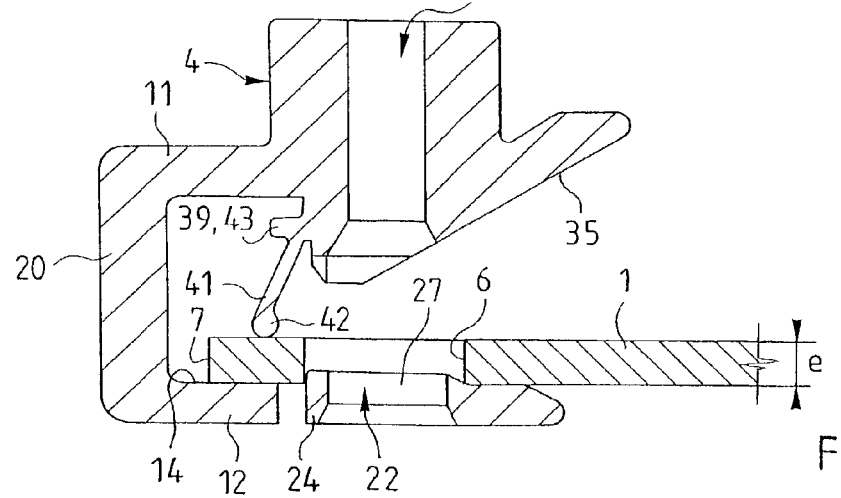
FIG. 10 is an analogous view to FIG. 7, in which the saddle is mounted on a panel that is much thinner than the distance between the arms.

Thus, in the example shown in FIG. 10, the panel 1 is formed by a single thin plate, the thickness e of which is equal to the distance d.

Figure 11:
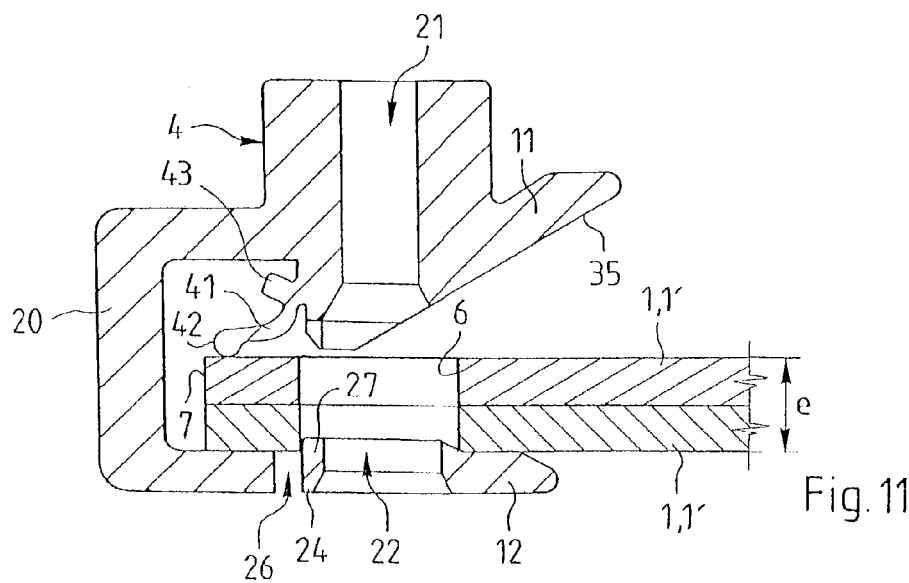
FIG. 11 is an analogous view to FIG. 10, in which the saddle is mounted on a panel made up of two superposed plates.

In the example shown in FIG. 11, the panel 1, the thickness e of which is between the distances d and D, is formed by the superposition of two thin plates 1' drilled with coaxial holes that jointly form the drilling 6.

In the example shown in FIGS. 8 and 9, the panel 1, which has a thickness e approximately equal to the distance D, is formed by the superposition of three thin plates 1' drilled with coaxial holes that jointly form the drilling 6.

The edge 7 of the panel 1 is guided by the ramp 35 and then the sloping face 46. It pushes the tongue 41, which, in reaction, pushes it towards the lower arm 12.

The panel 1 slides on the sloping face 29 formed on the lower ridge 27, which causes the gradual pushing aside of the lug 24 and, possibly, slight flexion in the lower arm 12 when the thickness e of the panel 1 is sufficient (this is particularly the case when the thickness e of the panel 1 is equal to the distance D).

When the axes A1 of the drilling 6 and A3 of the holes 21, 22 are approximately convergent, the inner ridge 27 is lodged in the drilling 6, the lug 24 returning through elasticity to its idle position with an audible click, as shown on FIGS. 8 to 11.

When the thickness e of panel 1 is sufficient, as shown on FIG. 8, the upper ridge 44 is also lodged in the drilling 6.

Whatever the thickness e of the panel 1, it is then gripped, either between the tongue 41 and the lower arm 12, (FIGS. 10, 11) or directly between the arms 11, 12 (FIG. 8).

Thus, when the saddle 4 is in mounted position, the arms 11, 12 are on either side of the panel 1, their holes 21, 22 facing the drilling 6 with their respective axes A3, A1 converging, whilst the plate 20 is placed facing its edge 7. The saddle 4 is therefore snapped onto and thus fixed to the panel 1, which is held against the lower arm 12 with the lower ridge 27 only or both ridges 27, 44 in its drilling 6.

The part to be fixed 2 is then held against the outer face 16 of the lower arm 12 by positioning its orifice 8 facing the lower hole 22, their respective axes A2, A3 being approximately convergent.

The screw 5 is inserted into the orifice 8, the aforementioned screw 5 passing successively through the lower hole 22 and the drilling 6 before engaging in the shank 23. As the screw 5 is self-tapping, it works its internal thread in the shank 23, in which the hole 21 has a smaller diameter than the hole 22 in the lug 24, with which the screw 5 does not interfere.

As the screw 5 is rotated, the two arms 11, 12 come closer together (given the relative thickness of the arms 11, 12 and the plate 20, this moving together mainly consists of the flexion of the lower arm 12 towards the upper arm 11) until the panel 1 is gripped between them, whilst the part 2 is gripped between the lower arm 12 and the screw head 10, the fixing of the part 2 thus being achieved.

It is possible that the saddle 4 has to be mounted in a predetermined direction on the panel 1, which may be equipped with mounting polarisation means to this end.

According to an embodiment illustrated in FIGS. 8 and 9, these mounting polarisation means are in the form of two facing ribs 50 that are located on either side of the drilling 6, and the distance between which is greater than the width of the upper arm 11, but less than the width of the lower arm 12, measured at the circular profile 33.

Thus, when the saddle 4 is being mounted the wrong way round, the circular profile 33 abuts against the ribs 50, which prevents the saddle 4 from being mounted. The saddle 4 must simply be turned around and mounted in place, the upper arm 11 being lodged between the ribs 50.

What is claimed is:

1. Device for fixing a part to a panel equipped with a drilling, such device comprising a saddle equipped with an upper arm and a lower arm that face each other and jointly define an opening opposite which they are connected by a plate, the upper arm and the lower arm being drilled with a coaxial upper hole and a lower hole respectively, the upper arm comprising a shank forming a nut in which the upper hole is made, the arms being able to be placed on either side of the panel with their holes facing the aforementioned drilling whilst the plate is placed facing the edge of the panel, the lower comprises and a lug flexibly articulated to the lower arm by a rim located at the side of the opening and in which the lower hole is made, the lug having a ridge that protrudes from the lower arm towards the upper arm and is able to be lodged in the aforementioned drilling to allow for the saddle to be snapped onto and thus fixed to the panel, wherein the plate is thicker than the upper arm, not including the shank and nut portion, and the plate is also thicker than the lower arm, not including the lug and ridge portion, and wherein the upper arm is thicker than the lower arm.

2. Device according to claim 1, wherein the aforementioned ridge has a face that slopes towards the aforementioned opening.

3. Device according to claim 1, wherein the aforementioned ridge extends circularly on the edge of the hole made in the lug.

4. Device according to claim 1, wherein the upper arm has a ramp that slopes towards the opening.

5. Device according to claim 1, wherein the lower arm has a chamfered free edge at the side of the aforementioned opening.

6. Device according to claim 1, wherein the aforementioned lug is delimited by a U-shaped cut-out, the concavity of which faces the aforementioned opening.

7. Device according to claim 1, wherein the aforementioned shank protrudes at least partly on a first side of the upper arm.

8. Device according to claim 7, wherein the aforementioned shank is ribbed on the first side of the upper arm.

9. Device according to claim 7, wherein the shank protrudes partly on a second side of the upper arm.

10. Device according to claim 9, wherein the aforementioned shank is extended, on the second side, by a ridge able to be lodged in the drilling made in the panel, when the saddle is mounted on the panel.

11. Device according to claim 9, wherein the upper arm has, on the second side, a collar that protrudes radially from the shank.

12. Device according to claim 1, wherein the upper arm has an elastically flexible tongue that protrudes towards the lower arm.

13. Device for fixing a part to a panel equipped with a drilling, such device comprising a saddle equipped with an upper arm and a lower arm that face each other and jointly define an opening opposite which they are connected by a plate, the upper arm and the lower arm being drilled with a coaxial upper hole and a lower hole respectively, the upper arm comprising a shank forming a nut in which the upper hole is made, the arms being able to be placed on either side of the panel with their holes facing the aforementioned drilling whilst the plate is placed facing the edge of the panel, and the lower comprises a lug flexibly articulated to the lower arm by a rim located at the side of the opening and in which the lower hole is made, the lug having a ridge that protrudes from the lower arm towards the upper arm and is able to be lodged in the aforementioned drilling to allow for the saddle to be snapped onto and thus fixed to the panel, wherein the aforementioned shank protrudes at least partly on a first side of the upper arm, wherein the shank protrudes partly on a second side of the upper arm, wherein the upper arm has, on the second side, a collar that protrudes radially from the shank, wherein the upper arm has an elastically flexible tongue that protrudes towards the lower arm, wherein the aforementioned tongue stems from the aforementioned collar.

14. Device for fixing a part to a panel equipped with a drilling, such device comprising a saddle equipped with an upper arm and a lower arm that face each other and jointly define an opening opposite which they are connected by a plate, the upper arm and the lower arm being drilled with a coaxial upper hole and a lower hole respectively, the upper arm comprising a shank forming a nut in which the upper hole is made, the arms being able to be placed on either side of the panel with their holes facing the aforementioned drilling whilst the plate is placed facing the edge of the panel, and the lower comprises a lug flexibly articulated to the lower arm by a rim located at the side of the opening and in which the lower hole is made, the lug having a ridge that protrudes from the lower arm towards the upper arm and is able to be lodged in the aforementioned drilling to allow for the saddle to be snapped onto and thus fixed to the panel, wherein the ridge is asymmetrical and extends substantially on one side of the lower hole.

15. A device for fixing a part to a panel having a first opening, the device comprising:
   a saddle having an first arm and a second arm that face each other and jointly define a second opening opposite which they are connected by a plate, the first arm and the second arm having a coaxial first hole and a second hole respectively, the first arm comprising a shank forming a nut in which the first hole is made, the arms positionable on either side of the panel with at least one of their holes facing the first opening, and the second arm comprises a lug pivotably connected to the second arm at the side of the second opening, the lug including the second hole and having a ridge that protrudes from the second arm towards the first arm, wherein the ridge is positionable within the first opening to allow for the saddle to be snapped onto and thus fixed to the panel, wherein the plate and the first arm have a first relative rigidity, wherein the plate and the second arm have a second relative rigidity, and wherein the first relative rigidity is greater than the second relative rigidity such that when the saddle is mounted on the panel, the plate and the first arm are relatively indeformable while the second arm is relatively elastically flexible.

16. The device according to claim 15, wherein the lug is delimited by a U-shaped cut-out, the concavity of which faces the opening.

17. The device according to claim 15, wherein the first arm has an elastically flexible tongue that protrudes towards the second arm.

18. The device according to claim 15, wherein the ridge is asymmetrical and extends substantially on one side of the second hole.

19. The device according to claim 15, wherein the first arm further comprises a collar that protrudes radially from the shank, and further comprising a tongue that stems from the collar.

20. An affixing system, comprising:
   a panel having an aperture;
   a saddle having an first arm and a second arm that face each other and jointly define an opening opposite which they are connected by a plate, the first arm and the second arm having a first hole and a second hole respectively, the first arm comprising a shank forming a nut in which the first hole is made, the arms positionable on either side of the panel with at least one of their holes facing the aperture, and the second arm comprises a lug independently flexibly connected to the second arm adjacent to the opening, the lug including the second hole and having a ridge that protrudes from the second arm towards the first arm, wherein the ridge is positionable relative to the aperture to allow for the saddle to be snapped onto and thus fixed to the panel;
   a part affixable to the panel;
   a fastening mechanism connectable between the part and the saddle to affix the part to the panel; and
   the plate having a first thickness, the first arm, not including the shank and nut portion, having a second thickness, and the second arm, not including the lug portion, having a third thickness, wherein the first thickness is greater than the second thickness, and wherein the second thickness is greater than the third thickness.

* * * * *